(12) United States Patent
Teng et al.

(10) Patent No.: US 6,674,604 B1
(45) Date of Patent: Jan. 6, 2004

(54) AC UNLATCH USING GREY CODE DETECTION WITH ZONE PARTITIONING

(75) Inventors: Jack Ming Teng, Singapore (SG); Kok Hiang Cheong, Singapore (SG); MingZhong Ding, Singapore (SG); KianKeong Ooi, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/541,401

(22) Filed: Mar. 31, 2000

Related U.S. Application Data
(60) Provisional application No. 60/141,613, filed on Jun. 30, 1999.

(51) Int. Cl.[7] .............................................. G11B 5/596
(52) U.S. Cl. ................................................. 360/78.04
(58) Field of Search ........................... 360/78.04, 78.14, 360/78.07, 256–256.6

(56) References Cited

U.S. PATENT DOCUMENTS

| | | | |
|---|---|---|---|
| 4,562,500 A | 12/1985 | Bygdnes ..................... 360/105 |
| 4,890,176 A | 12/1989 | Casey et al. ................. 360/105 |
| 5,117,318 A | 5/1992 | Immler et al. ............... 360/105 |
| 5,187,627 A | 2/1993 | Hickox et al. .............. 360/105 |
| 5,303,101 A | 4/1994 | Hatch et al. ................ 360/105 |
| 5,341,259 A | 8/1994 | Amirkiai et al. ............ 360/105 |
| 5,363,261 A | 11/1994 | Eckberg et al. ............. 360/105 |
| 5,369,538 A | 11/1994 | Moe et al. ................... 360/106 |
| 5,384,675 A | 1/1995 | Crawforth et al. ............ 360/75 |
| 5,530,602 A * | 6/1996 | Boutaghou et al. ........... 360/75 |
| 5,568,333 A | 10/1996 | Bang ........................... 360/105 |
| 5,581,424 A | 12/1996 | Dunfield et al. ............ 360/105 |
| 5,583,724 A | 12/1996 | Kim et al. ................... 360/105 |
| 5,600,219 A | 2/1997 | Gomez ....................... 318/456 |
| 5,694,271 A | 12/1997 | Stefansky ................... 360/105 |
| 5,734,527 A | 3/1998 | Reinhart .................... 360/105 |
| 5,805,384 A | 9/1998 | Bronshvatch et al. ....... 360/105 |
| 5,812,345 A | 9/1998 | MacPherson et al. ....... 360/105 |
| 5,883,749 A | 3/1999 | Park ........................... 360/75 |
| 6,212,027 B1 * | 4/2001 | Lee et al. ................. 360/78.14 |

* cited by examiner

*Primary Examiner*—David Hudspeth
*Assistant Examiner*—Mitchell Slavitt
(74) *Attorney, Agent, or Firm*—Derek J. Berger

(57) ABSTRACT

An information handling system, such as a disc drive, includes a base, a disc stack rotatably attached to the base, and an actuator assembly movably attached to the base. A region of the disc stack is identified as a parking band, and when power is not provided to the disc drive, the actuator assembly is held in a parked position within the parking band by a magnetic latch. The magnetic latch is overcome during a powerup process by a voice coil motor coupled to the actuator. Other regions of the disc stack are associated with various functions performed by the voice coil motor as the actuator passes over such regions.

20 Claims, 10 Drawing Sheets

AC UNLATCH USING GREY CODE DETECTION WITH ZONE PARTITIONING

RELATED APPLICATION

This application claims the benefit of U.S. Provisional Application Ser. No. 60/141,613, filed Jun. 30, 1999 under 35 U.S.C. 119(e).

FIELD OF THE INVENTION

This invention relates to the field of mass storage devices. More particularly, this invention relates to unlatching the actuator of a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding and decoding data so that it can be successfully written and retrieved from the disc recording surface. A microprocessor controls most of the operations of the disc drive as well as passing the data and commands between a host computer and the disc drive.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") that includes rails and a cavity between the rails. When the disc rotates, air is dragged between the rails and the disc surface causing pressure, which forces the head away from the disc. At the same time, the air rushing past the cavity or depression in the air-bearing surface produces a negative pressure area. The negative pressure or suction counteracts the pressure produced at the rails. The slider is also attached to a load spring that produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage disc after the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided into sectors. The sectors are grouped together on the tracks. In some disc drives, the tracks are a multiplicity of concentric circular tracks. In other disc drives, a continuous spiral is one track. Servo feedback information is used to accurately locate the transducer. The actuator assembly is moved to the required position and held very accurately during a read or write operation using the servo information.

When power to the actuator is not present, it is moved to a safe location on the disc, or "parked." Many times a magnetic latch is employed to hold the actuator in the parked position. When the actuator must be moved from the parked position, current disc drives progressively pump or step-increment current to a voice coil motor (VCM) coupled to the actuator, until the actuator produces a force to break the magnetic force used to latch the actuator. After overcoming the magnetic force, movement of the actuator is monitored closely by the servo controller to prevent the actuator from hitting a crash stop generally positioned at the outer periphery of the disc.

Due mainly to the increasing popularity of portable and notebook computers, there is a trend in the industry towards increased non-operating rotational shock requirements. This in turn requires magnetic latches to have greater capacity. In other words the magnetic latch must apply larger amounts of magnetic force. The prior art approaches to unlatching an actuator require an incremental step of current to be provided to the VCM to unlatch the actuator; this method is also known as DC unlatch. For a larger magnetic latch, using this method, a large amount of current will be needed to pump to the VCM. The amount of current necessary to employ the DC unlatch method is a primary factor in increasing the size and cost of the power amplifier required to produce such a current. There is a strong desire in the industry to reduce the size and cost of disc drives, rather than increase them. Therefore, the DC unlatch method is unacceptable for disc drives intended to have increased non-operational rotational shock requirements.

Another approach is a method called AC unlatch. In this method, the current to the VCM is applied in an alternating direction so as to produce a resonance frequency equal to the natural frequency of the bumper that holds the magnetic latch.

There are various prior art schemes for monitoring the movement of the actuator. For example, back EMF of the VCM, or grey code information, may be used to indicate the acceleration or velocity of the actuator.

SUMMARY OF INVENTION

An information handling system, such as a disc drive, comprises a base, an actuator attached to the base, a voice coil motor, and a disc stack rotatably attached to the base. The voice coil motor determines the motion and position of the actuator. The disc is divided into a plurality of servo zones, corresponding to a respective plurality of profiles of the actuator motion with respect to the disc. A current driver applies variable magnitude current to the voice coil motor, based on the particular servo zone where the actuator is located. The disc may be provided with at least a parking band zone defining a first area in which the actuator remains parked, and a guard band zone defining a second area in which the actuator has just become unlatched. The parking band zone may be provided with a servo system that determines whether the actuator has unlatched successfully. The current driver may apply alternating current when the actuator is in the parking band zone. The servo system may monitor the position of the actuator when the actuator is in the guard band zone, and the controller may control the current driver to adjust the speed of the actuator based on the motion of the actuator. The current driver may apply at least two, and preferably four, different frequencies of alternating current while the actuator is latched. The current driver may attempt to unlatch the actuator at least two, and preferably thirty-two, times. The current driver may change the frequency if at least one, and preferably eight, attempt(s) has (have) been unsuccessful. The current driver may apply a variable initial current magnitude during each subsequent attempt to unlatch the actuator after an unsuccessful attempt. The invention includes a method of accomplishing any or all of the functions of such an information handling system or disc drive.

Advantageously, the invention reduces the amount of current necessary to unlatch the actuator. Therefore, the invention decreases the size and cost of the power amplifier required to produce an unlatch current. Advantageously, this invention is well suited for disc drives intended to have increased non-operational rotational shock requirements.

DESCRIPTION OF THE PREFERRED EMBODIMENT

In the following detailed description of the preferred embodiments, reference is made to the accompanying drawings, which form a part hereof, and in which are shown by way of illustration specific embodiments in which the invention may be practiced. It is to be understood that other embodiments may be utilized and structural changes may be made without departing from the scope of the present invention.

Figure 1:
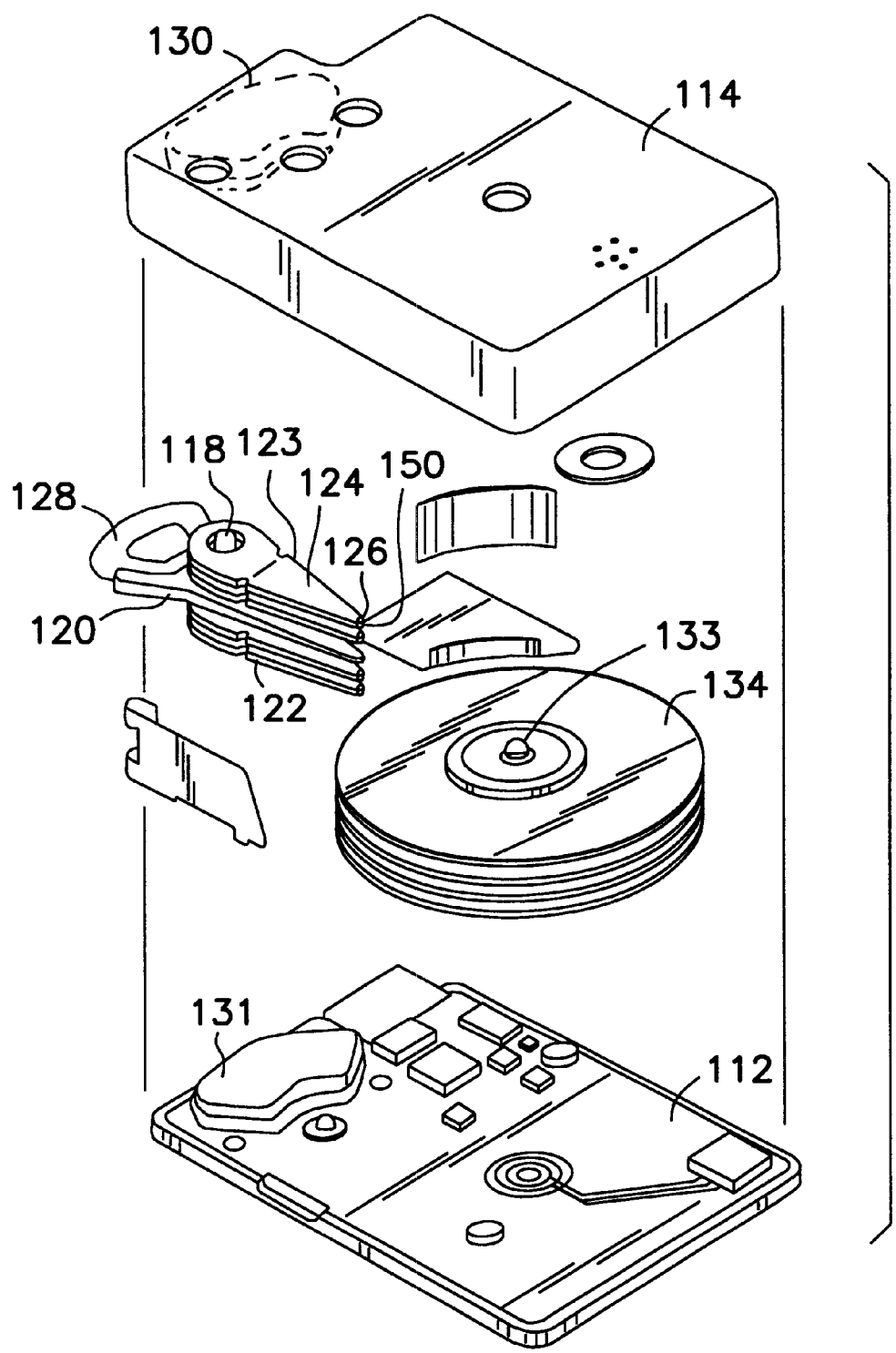
FIG. 1 is an exploded view of a disc drive with a multiple disc stack.

The invention described in this application is useful with all mechanical configurations of disc drives having rotary actuation. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126, which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor, which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors that are within the hub 133 or under the hub.

Figure 9:
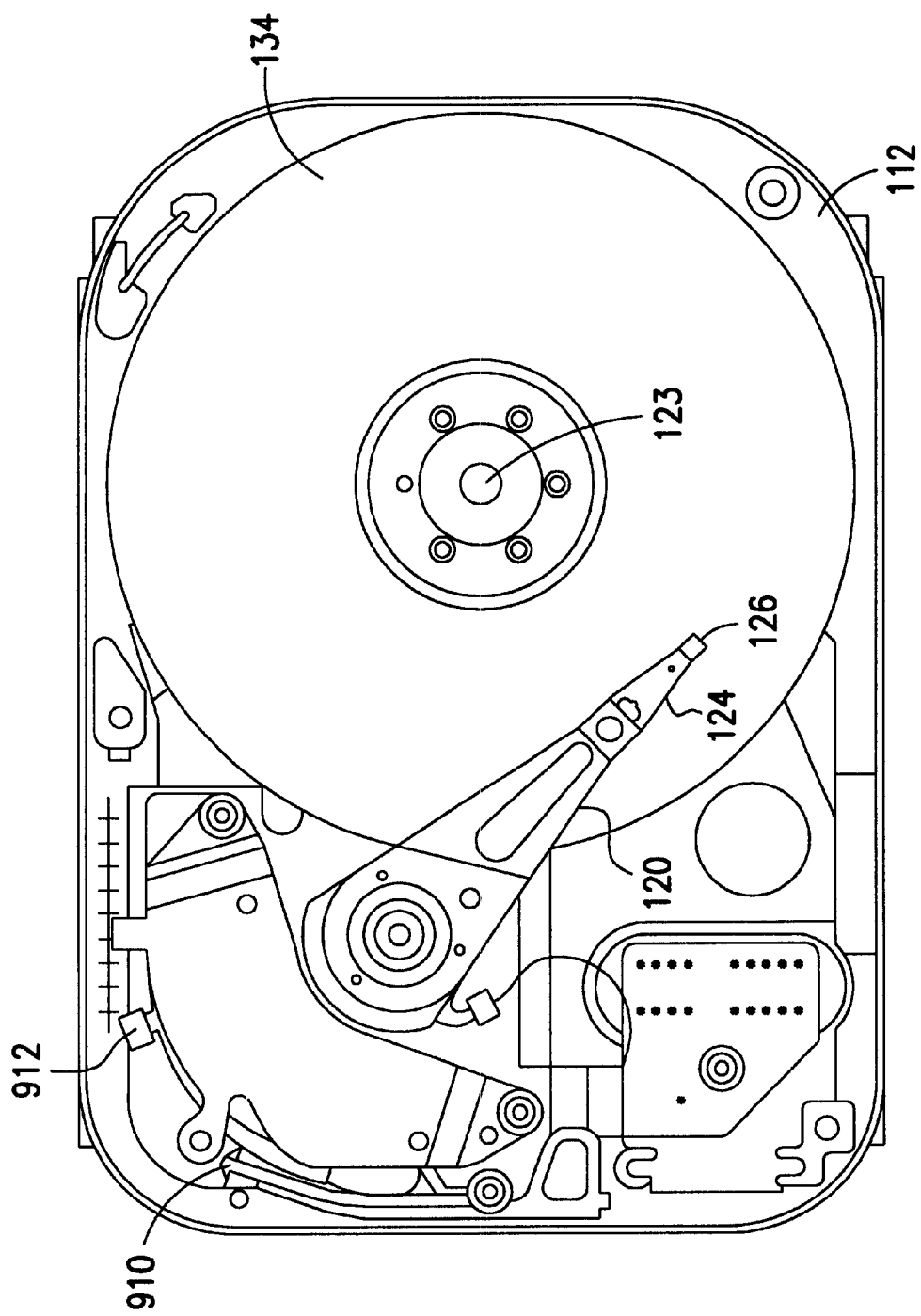
FIG. 9 is a top view of a disc drive with an actuator latch and a bumper for the actuator latch.

FIG. 9 is a top view of a disc drive 100 which more shows an actuator latch 910 which latches the actuator assembly 120 into a parked position. The disc drive 100 also includes a bumper 912 for the actuator latch 910. This top view shows the actuator latch 910 and the bumper 912 more clearly than FIG. 1. Corresponding components are numbered for the convenience of the reader but a description of these components is not repeated here.

Figure 2:
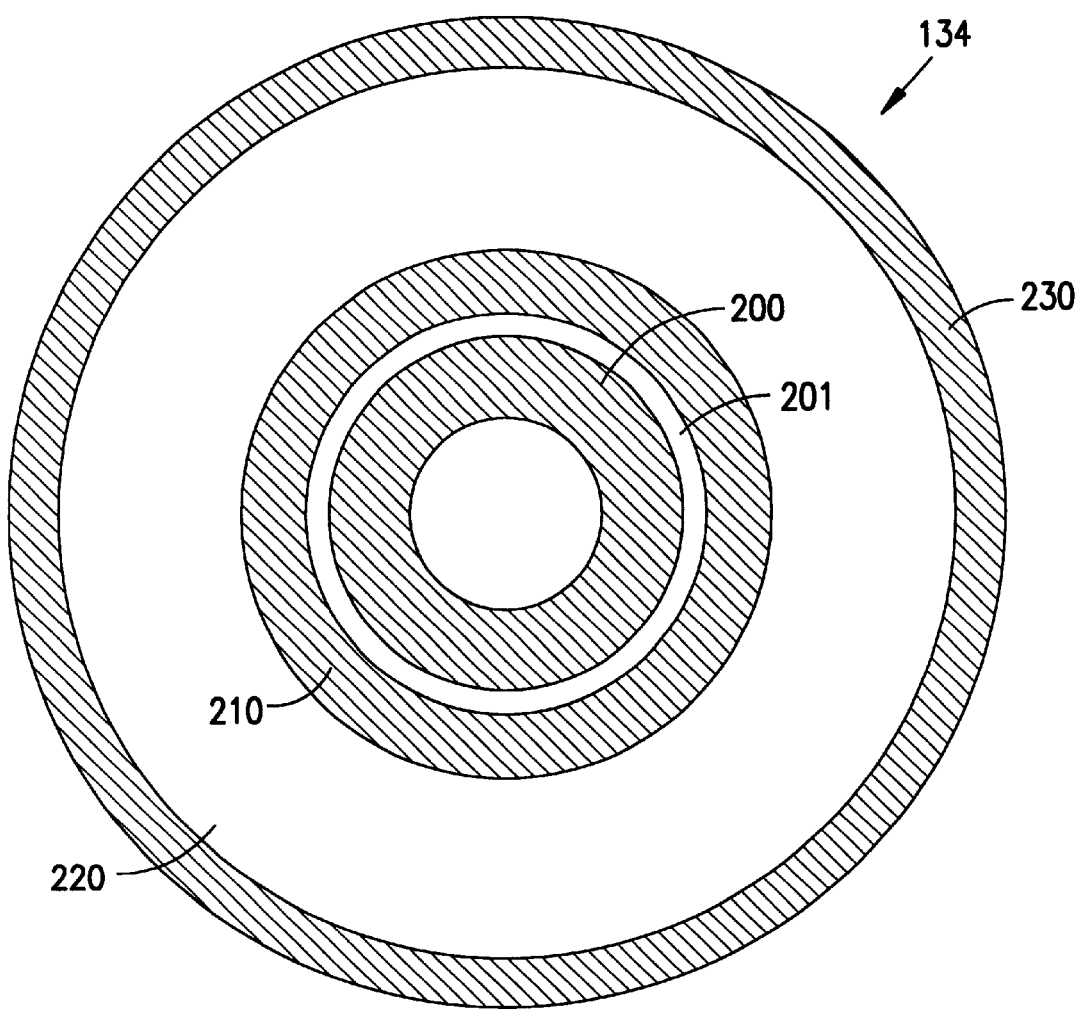
FIG. 2 is a schematic representation of the partitioning of the servo bands of the discs into a plurality of zones.

FIG. 2 indicates schematically the partitioning of the servo bands of the discs into at least two servo zones. The first servo zone is Parking Band Zone 200, which defines the servo zone where the actuator remains in a parked position. The second servo zone is an inner diameter (ID) Guard Band Zone 210, which defines the servo zone in where the actuator is located just after it has become unlatched and left Parking Band Zone 200 in a radially outward direction. Shown, but not required, is a third servo zone, a Parking Boundary Zone 201 is at the outermost end of Parking Band Zone 200. The Parking Boundary Zone 201 may be a servo band or track. As in the prior art, Data Band Zone 220 is the user data area, and an outer diameter (OD) Guard Band Zone 230 defines an area where the actuator is forbidden to enter. This prevents the actuator from crashing into the crash stop at the outer diameter.

In the Parking Band Zone 200, the current to the VCM is alternated to simulate the bumper's resonance frequency. Parking Boundary Zone 201 determines whether the actuator has unlatched successfully, as the actuator is not at that location unless it has left Parking Band Zone 200.

Once the actuator is unlatched and passed Parking Boundary Zone 201, it is within ID Guard Band Zone 210. The force required to overcome the magnetic latch can be quite large; because the force required is directly proportional to the acceleration of the actuator, the actuator might move too rapidly towards the outer regions of the disc, which could damage the recording head carried by the actuator.

Therefore, in ID Guard Band Zone 210, the grey code (or signal coming from the servo system) is monitored closely. Grey code is part of the servo field information written to the disc, which yields positional information within any zone. A decelerating current is applied to the VCM to slow down the actuator if the position information indicates that the actuator 120 is moving too fast or has been over accelerated. Over acceleration indicates that the force used to unlatch the magnetic latch was too high. If the force is too low, an accelerating current is applied to increase the speed of the actuator. This process is repeated until the actuator leaves ID Guard Band Zone 210.

Once the actuator leaves ID Guard Band Zone 210 and enters Data Band Zone 220, no current is applied to the VCM based on the amount of force used to unlatch the magnetic latch. Conventional interrupt-driven servo commands are applied. In other words, a starting track and target track are determined and velocity profile are followed for long seeks within the data band zone 220. Of course for short seeks or track switches, no velocity profile may be needed.

In a first preferred embodiment, a set of M, where M has a value of at least two, different frequencies (in the form of alternating currents with 2 types of duty cycles) are applied to the VCM during the attempt to unlatch the actuator while the actuator 120 is positioned at the Parking Boundary Zone 201. A total of N, where N is at least 2 and is greater than or equal to M, attempts are made. If at least R, where R is at least 1 and less than or equal to N, attempts have been unsuccessful, the frequency applied to the actuator is changed to the frequency corresponding to a different value of M. In the most preferred embodiment, M has the value of four, N has the value of 32, and R has the value of (M/N)=8. This embodiment overcomes problems associated with variability in the required unlatch current frequency. One cause of such variable current frequency requirements is the dependence on operating and ambient temperatures of the unlatch current frequency.

In a second preferred embodiment, a variable initial current magnitude is applied during each subsequent attempt to unlatch the actuator after a first unsuccessful attempt. This embodiment overcomes problems associated with the variety of magnetic forces required to unlatch actuators of differing design.

The first and second preferred embodiments may each be practiced alone. In another preferred embodiment, they are practiced together. In this preferred embodiment, the invention is implemented in the form of an algorithm comprising one main routine having four states, each of which is implemented in a separate subroutine. The main routine describes the main flow and checking of conditions to determine to which state or subroutine the algorithm branches. The four states describe the necessary steps taken to ensure that the unlatch procedure is accomplished.

Figure 3:
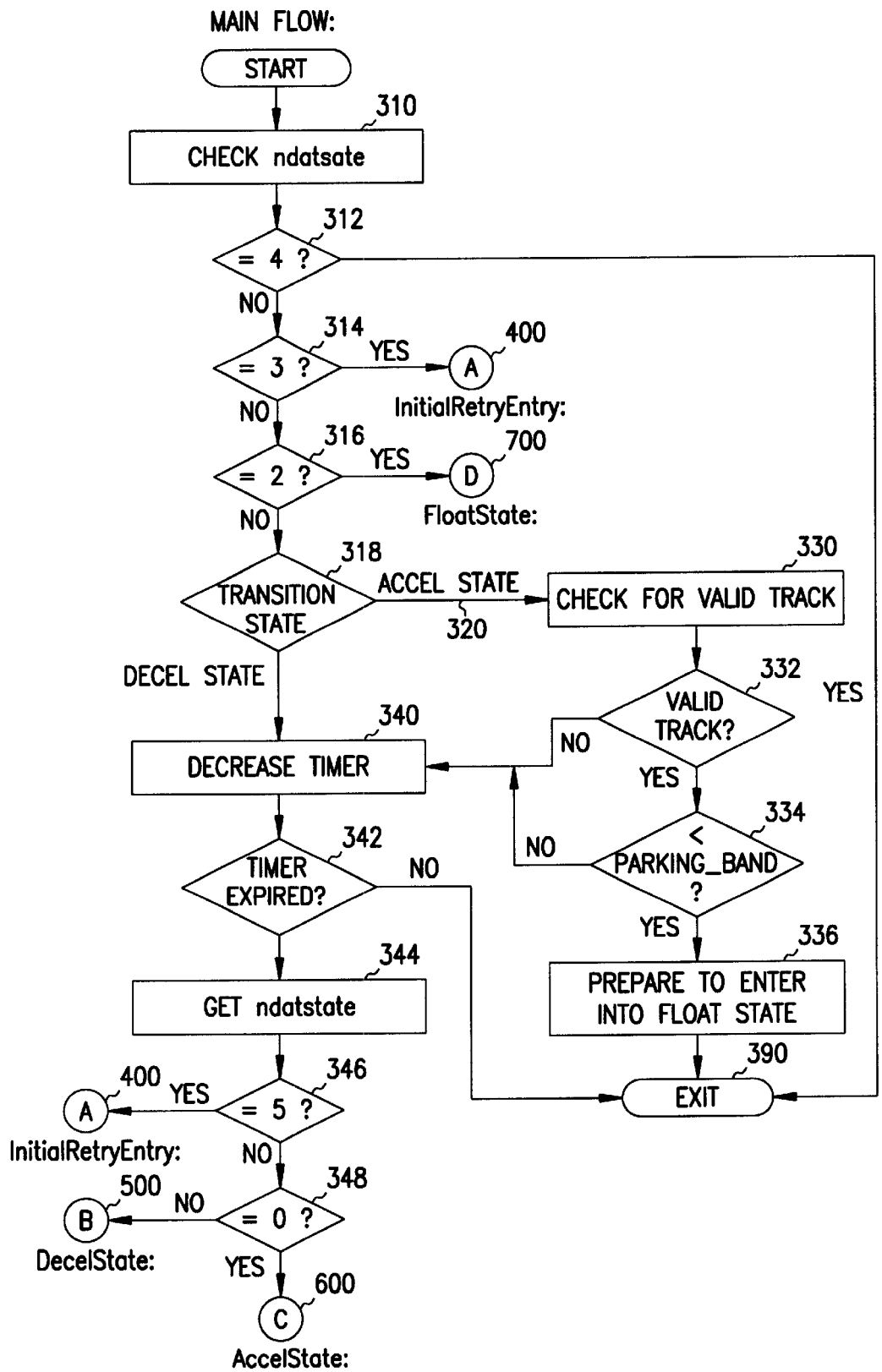
FIG. 3 is a flowchart of the preferred embodiment of the algorithm of the invention.

FIG. 3 shows the main Actunlatch routine. During power up, a variable ndatstate is initialized with a value (0, 1, 2, 3, 4 or 5) so that the algorithm initializes the AC unlatch variables when it enters the Actunlatch routine for the first time. The algorithm evaluates the value of ndatstate, as depicted by reference number 310, to determine the appropriate state to take. Table 1 describes the value of ndatstate with the corresponding state and its immediate action.

TABLE 1

| ndatstate | State | Action Taken |
|---|---|---|
| 0 | AccelState | Wait for timer to expire before jump |
| 1 | DecelState | Wait for timer to expire before jump |
| 2 | FloatState | Immediate jump |
| 3 | InitialRetryLatch | Immediate jump |
| 4 | Finished Unlatch | Exit unlatch routine |
| 5 | InitialRetryEntry (on unlatch retry) | Immediate jump |

In AccelState where the algorithm is waiting for timer to expire, a check is made to see whether the current servo track has left a particular servo track defined in Parking Band Zone 200 and known as PARKING_BAND. If this condition is met, the algorithm starts to prepare to enter into FloatState, otherwise the algorithm just waits for the timer to expire. In DecelState, this checking is not required.

Checking the ndastate state is initially done through a series of decision boxes 312, 314 and 316. In decision box 312, it is determined whether or not the ndastate equals 4. If the ndastate equals 4, the unlatch operation is finished and the unlatch routine is exited as depicted by exit box 390. If the ndastate does not equal 4, the next decision 314 is encountered. If the ndastate equals 3, then an initial retry is started and the process jumps to the initial retry entry subroutine which is further detailed in FIG. 4. If the ndastate does not equal 3, then the next decision box 316 is encountered to determine whether or not the ndastate equals 2. If the ndastate equals 2, the action taken is an immediate jump to the FloatState subroutine depicted by FIG. 7. In the FloatState, appropriate current will be supplied to the voice coil motor to ensure the actuator is moving towards the data band zone.

The next decision tree is to determine whether the actuator arm 120 and the transducer attached thereto 150 is in a transition state, as depicted by reference number 318. If the transition state is an acceleration state, as depicted by arrow 320, a check for a valid track is conducted, as depicted by reference number 330. A decision box regarding a valid track, as depicted by reference numeral 332, determines whether the track is actually valid. If the track is valid, it is determined whether or not the track is less than the PARKING_BAND. If the track number is less than the number associated with the PARKING_BAND, this indicates that the slider and transducer 150 has left the Parking Band zone and entered into ID Guardband zone and the actuator arm 120 prepares to enter into the FloatState, as depicted by reference number 336. If the valid track number is not less than the PARKING_BAND, then the timer is decreased, as depicted by reference number 340. Also, if the track is not considered a valid track at decision box 332, the timer is also decreased, as depicted by reference number 340. The next step is to determine if the timer has expired, as depicted by reference number 342. If the timer has expired, then the ndastate is again obtained, as depicted by reference number 344. If the ndastate is equal to 5, an immediate jump is taken to the initial retry entry which is further described in FIG. 4. If the decision box 346 does not indicate that the ndastate is equal to 5, then the next decision box 348 is encountered in which the ndastate is determined if it equals 0. If it is not equal to 0, then the subroutine for a DecelState, which is described in FIG. 5, is the next subroutine. If the ndastate is equal to 0, then the next subroutine encountered is for the AccelState is run. The AccelState is further described in FIG. 6.

Figure 4:
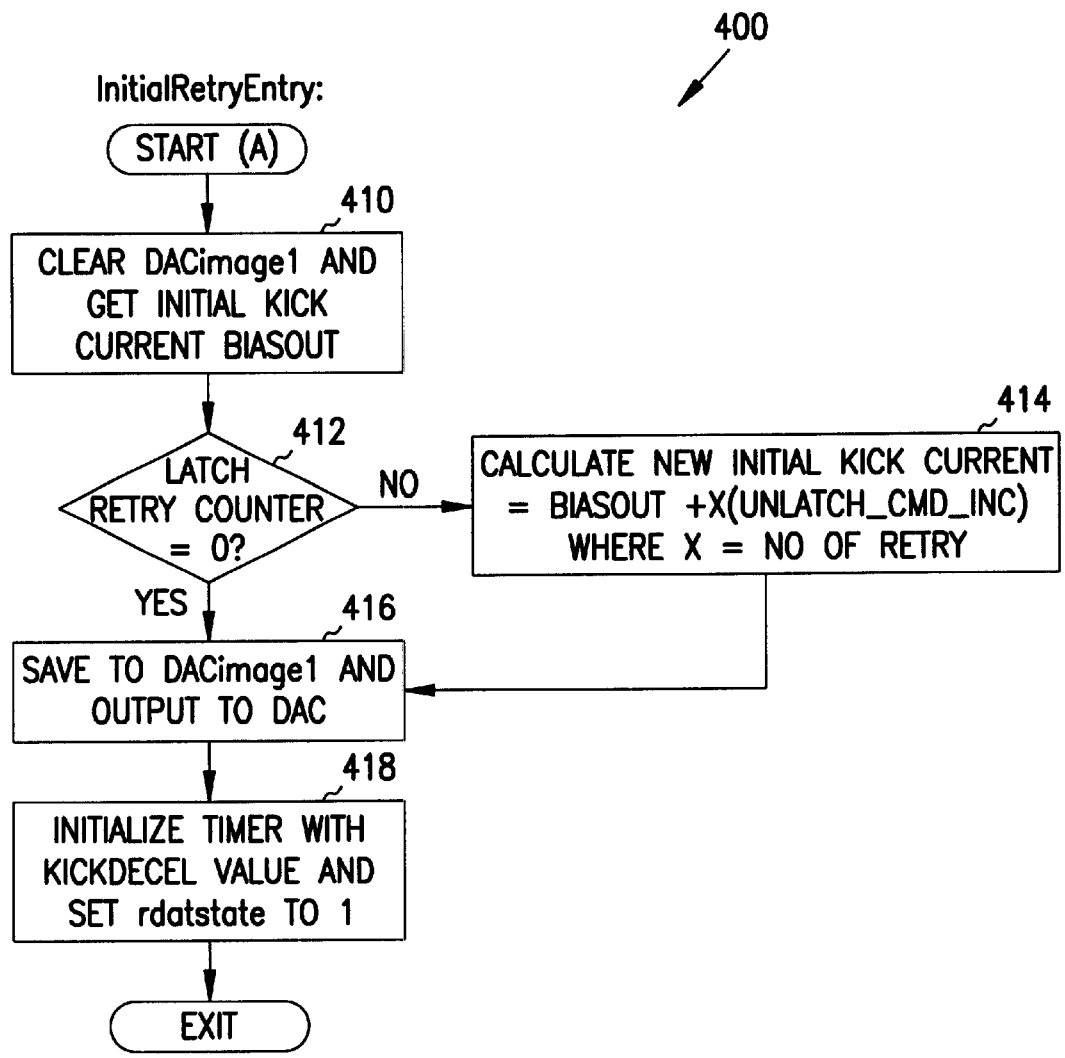
FIG. 4 is a flowchart of the Initial Retry Entry subroutine of the invention.
Figure 5:
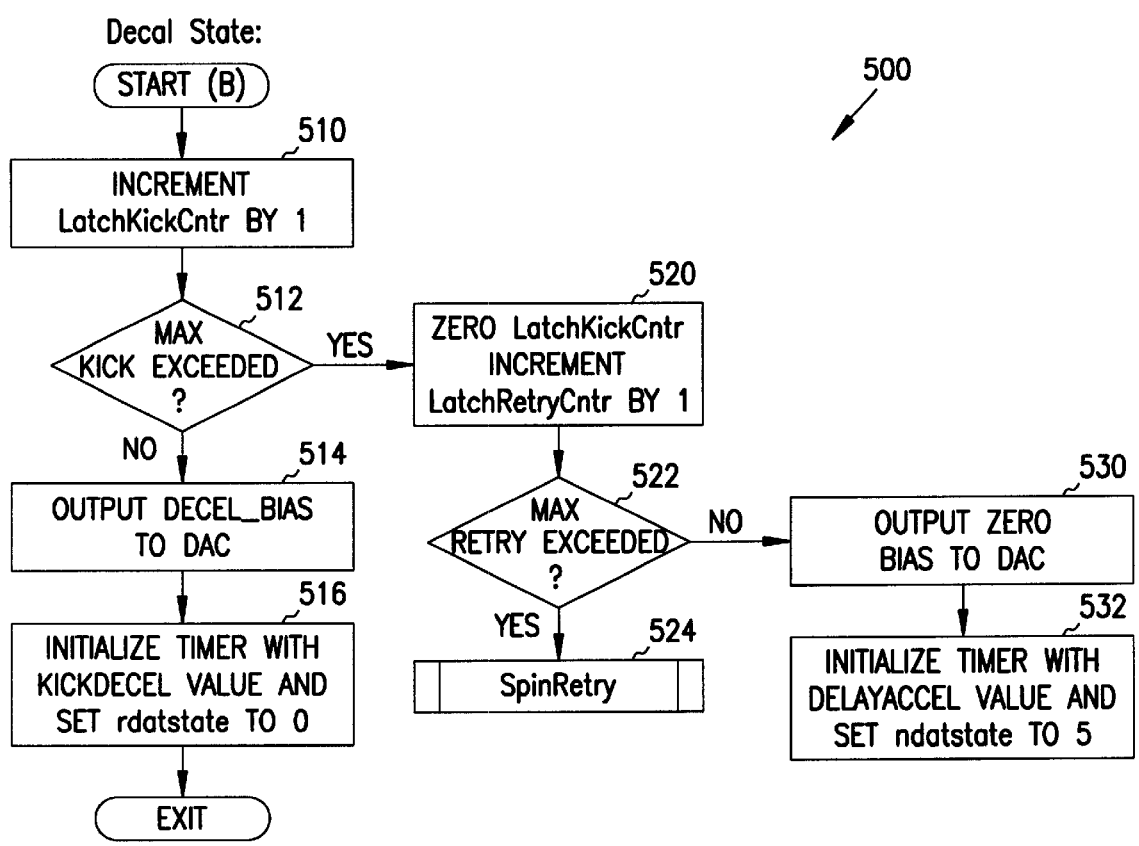
FIG. 5 is a flowchart of the Decel State subroutine of the invention.

FIG. 4 shows the InitialRetryEntry subroutine. As a general overview, in this state, an initial "kick current," BIASOUT is programmed into the DAC and stored in variable DACImage1. Also, a timer with a value of KICK-DECEL is set. A value of 1 is programmed to ndatstate so that when the timer expires, the algorithm jumps to Decel-State. In subsequent unlatch retries, an incremental value of UNLATCH_CMD_INC is added with BIASOUT as the initial kick current. The incremental value which is added to BIASOUT depends on the number of unlatch retries and a variable stored in LatchRetryCntr.

The first step in the initialretry subroutine 400 is to clear the DAC image IMAGE1 and get an initial kick current, BIASOUT, as depicted by reference numeral 410. After obtaining the initial kick current, a decision box 412 determines whether the latch retry counter equals 0. If the latch retry counter does not equal 0, a new initial kick current is calculated as depicted by reference numeral 414. If the latch retry counter does equal 0, the value is saved to DACImage1 and output to the digital to analog converter, as depicted by step 416 in FIG. 4. The next step is to initialize the timer with the KICKDECEL value and to set ndatstate to 1, as depicted by reference numeral 418. The next step is to exit the subroutine.

FIG. 5 shows the DecelState subroutine. The number of kicks, stored in a variable LatchKickCntr, is incremented by 1 and compared to the maximum kick value, DELAY_SAMPLE. If it is less than the maximum value, a kick current DECEL_BIAS is programmed to the DAC and a timer with a value of KICKDECEL is set. A value of 0 is programmed to ndatstate so that when the timer expires, the algorithm jumps to AccelState. If the value exceeds the maximum value, LatchKickCntr is reinitialized back to zero; also, LatchRetryCntr is incremented by 1 and this counter is checked to determine whether it has reached the maximum unlatch retries permitted. If it has, a spinup retry is called, and if it has not, a zero current is programmed to DAC and a timer with a value of DELAYACCEL is set. A value of 5 is programmed to ndatstate so that when the timer expires, the algorithm jumps to InitialRetryEntry.

With the above overview in mind, the specifics of the subroutine as shown in FIG. 5 will now be discussed. As shown by reference numeral 510, the first step is to increment the LatchKickCntr by 1, as depicted by reference numeral 510. The next step is to determine if the max kick has been exceeded, as depicted by decision box 512. If the max kick has not been exceeded and DECEL_BIAS is output to the digital to analog converter, as depicted by reference numeral 514. The next step is to initialize the timer with a KICKDECEL value and set the ndatstate to 0, as depicted by reference numeral 516. Setting the ndatstate to 0 makes the algorithm jump to the AccelState when the timer expires. If the max kick is exceeded, a 0 LatchKickCntr is cleared and LatchRetryCntr is incremented by 1, as depicted by reference numeral 520. The next step is to determine if the maximum retry number has been exceeded, as depicted by decision box 522. If it has, then a spin retry is attempted, as depicted by reference numeral 524, before exiting the subroutine. If the maximum retry has not been exceeded, then 0 bias is output to the digital to analog converter, as depicted by reference numeral 530. The next step then is to initialize the timer with a DELAYACCEL value and set the ndatstate to 5, as depicted by reference numeral 532 and exit the subroutine.

Figure 6:
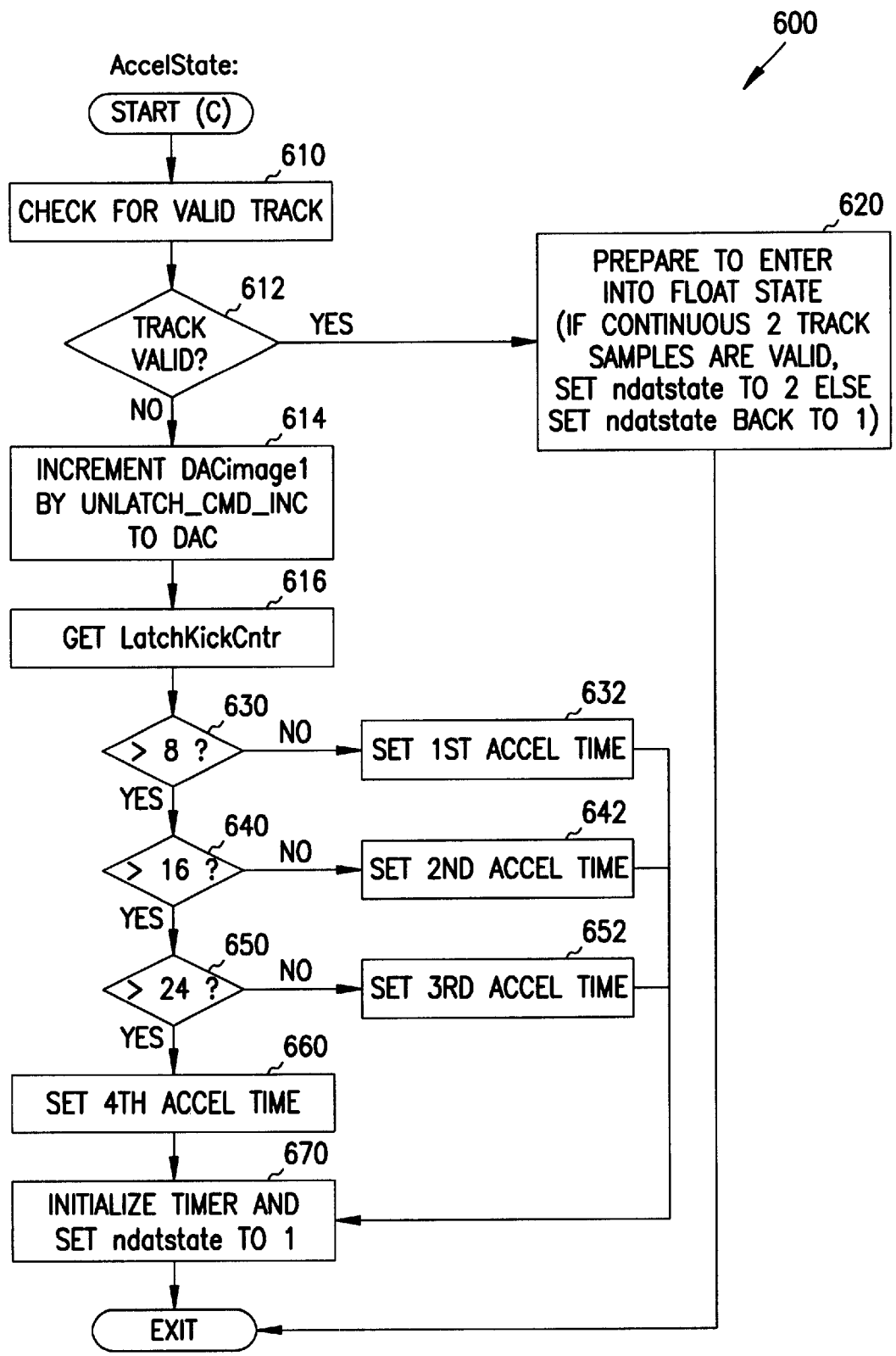
FIG. 6 is a flowchart of the Accel State subroutine of the invention.

FIG. 6 shows the AccelState subroutine 600. The current track is checked to see whether the actuator has left the PARKING_BAND. If this condition is met, the algorithm starts to prepare to go into FloatState, otherwise a kick current is programmed into the DAC and a timer is set. This kick current uses the data stored in DACImage1 and is incremented by UNLATCH_CMD_INC every time the algorithm enters this state. The timer value is dependent on the LatchKickCntr because the value programmed simulates the four different frequencies. A value of 1 is programmed into ndatstate so that when the timer expires, the algorithm jumps to DecelState.

Now turning to FIG. 6 to further detail the AccelState subroutine 600, the first step is to check for a valid track, as depicted by reference numeral 610. The decision box 612 determines whether there is a valid track outside of the PARKING_BAND 200, as depicted by decision box 612. If the track is valid, the actuator arm is prepared to enter into the FloatState if two continuous track samples are valid, as depicted by reference numeral 620. If two continuous track samples are valid, the ndastate is set to 2 and if not, the ndastate is set to 1. As you will recall, the ndastate of 2 relates to the FloatState and the ndastate of 1. corresponds to the DecelState. After step 620, the AccelState subroutine is exited. If the track is not valid, the DACImage1 is incremented by the UNLATCH_CMD_INC to the digital to analog converter, as depicted by step 614 in FIG. 6. The next step is to get the LatchKickCntr value, as depicted by reference number 616. If the LatchKickCntr value is greater than 8, as depicted by decision box 630, then it drops to another decision box 640 to determine if the LatchKickCntr value is greater than 16. If the LatchKickCntr is greater than 16, another decision box 650 is encountered to determine if the LatchKickCntr value is greater than 24. If the Latch-KickCntr is greater than 24, a fourth acceleration time is set, as depicted by reference numeral 660. Then the timer is initialized and an ndastate of0 is set. A value of0 is programmed into the ndastate so that when the timer expires, the algorithm jumps to the AccelState. If the LatchKickCntr is not greater than 8 at decision box 630, a first acceleration time is set, as depicted by reference numeral 632. Similarly, if the LatchKickCntr is not greater than 16 at decision box 640, then a second acceleration time is set, as depicted by reference numeral 642. Finally, if the LatchKickCntr is not greater than 24 at decision box 650, a third acceleration time is set, as depicted by reference numeral 652. After setting either the first acceleration time, 632, the second acceleration time, 642, the third acceleration time, 652, or the fourth acceleration time, 660, the timer is then initialized and the ndastate is set to 1 so that the algorithm jumps to the DecelState after the timer expires.

Figure 7:
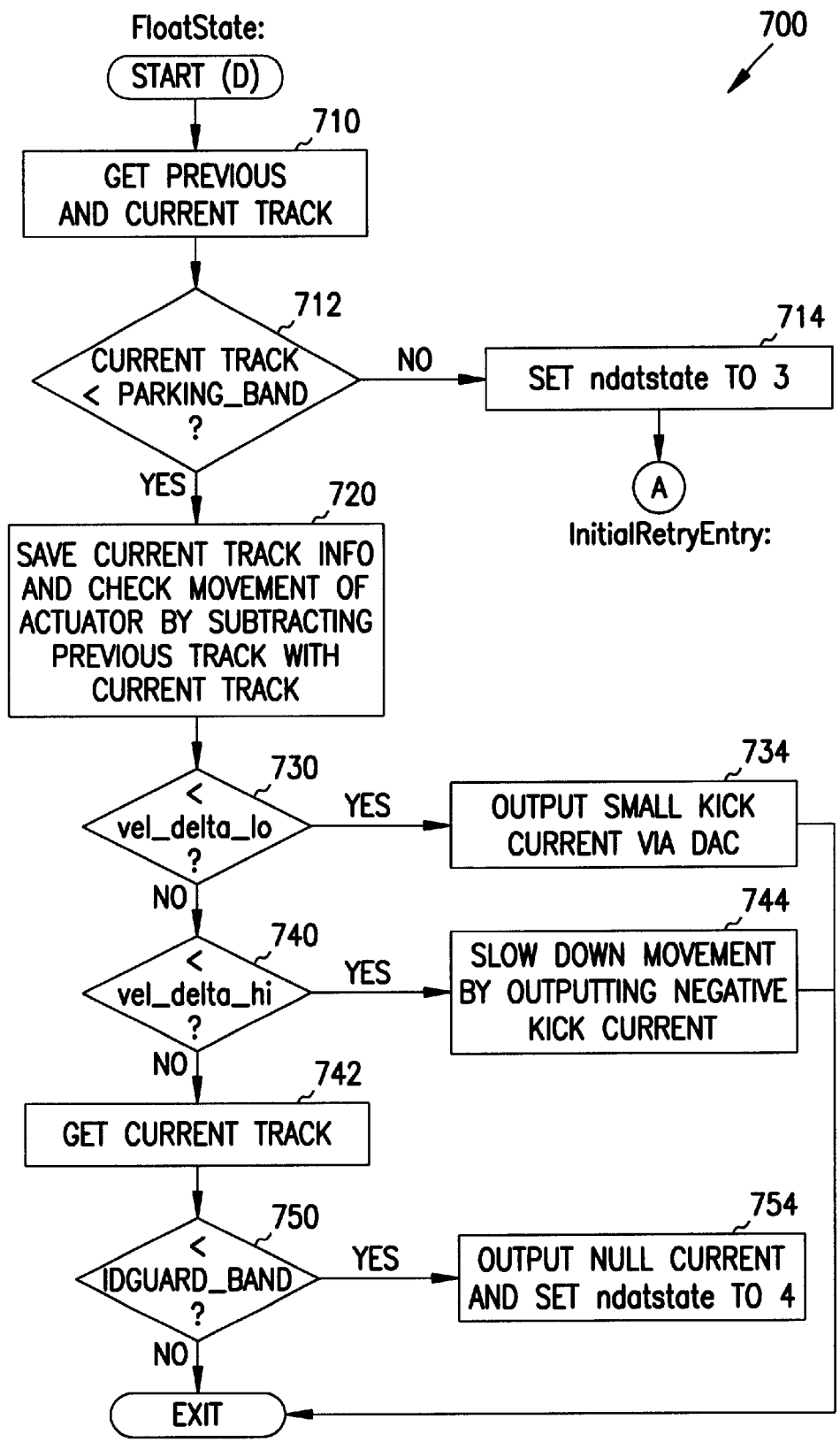
FIG. 7 is a flowchart of the Float State subroutine of the invention.

FIG. 7 shows the FloatState subroutine 700. The current track is checked to see whether the actuator has left the PARKING_BAND. If this condition is not met, the algorithm restarts the unlatch routine all over again by jumping to InitialRetryState, otherwise the actuator acceleration is checked and appropriate current is programmed into the DAC so that the actuator can move toward the outer perimeter of the disc within the speed limit. The actuator acceleration is determined by comparing the values corresponding to the locations of the current and previous servo tracks. If the difference in values is too large (i.e., actuator movement is too fast), a deceleration current is programmed into the DAC to slow down the actuator. If not, a very small kick current is programmed into the DAC. The current track is also queried to check whether the actuator has left IDGUARD_BAND, which is a specific servo track in ID Guard Band Zone 210. If this condition is met, a value of 4 is programmed into ndatstate to indicate successful unlatching of the actuator, and thus the end of the unlatch algorithm.

If not, a value of 2 is programmed into ndatstate so that the unlatching process is terminated and the next interrupt produces a jump to FloatState.

Again, looking at FIG. 7, the FloatState subroutine 700 will be further described. The first step in the FloatState subroutine is to get the previous and current tracks, as depicted by reference numeral 710. The next step, as depicted by decision box 712, is to determine if the current track is lesser than the track number associated with the PARKING_BAND. If the current track number is lesser than a track number associated with the PARKING_BAND, the current track info is saved and the movement of the actuator is checked by subtracting the previous track information and the current track information, as depicted by reference numeral 720. The velocity δ is determined. Then the velocity δ is determined whether or not it is low, as depicted by decision box 730. If the velocity δ is low, a small kick current is output via the DAC to the actuator arm, as depicted by reference numeral 734. If the velocity δ is not low, a decision box determines whether or not the velocity δ is high, as depicted by reference numeral 740. If the velocity δ is less than the high, then slow movement is achieved by outputting negative kick current, as depicted by reference numeral 744 to the actuator arm. If the velocity δ is not less than the high value, the current track is obtained, as depicted by reference numeral 742. The next step is to determine if the track number obtained in step 742 is less than the tracks associated with the ID guard band, as depicted by decision box 750. If the track number obtained is less than the track number associated with the IDGUARD_BAND, a null current is output to the arm and the ndastate is set to 4. When the ndastate is set to 4, the unlatch is considered finished and you exit the main unlatch subroutine.

Figure 8:
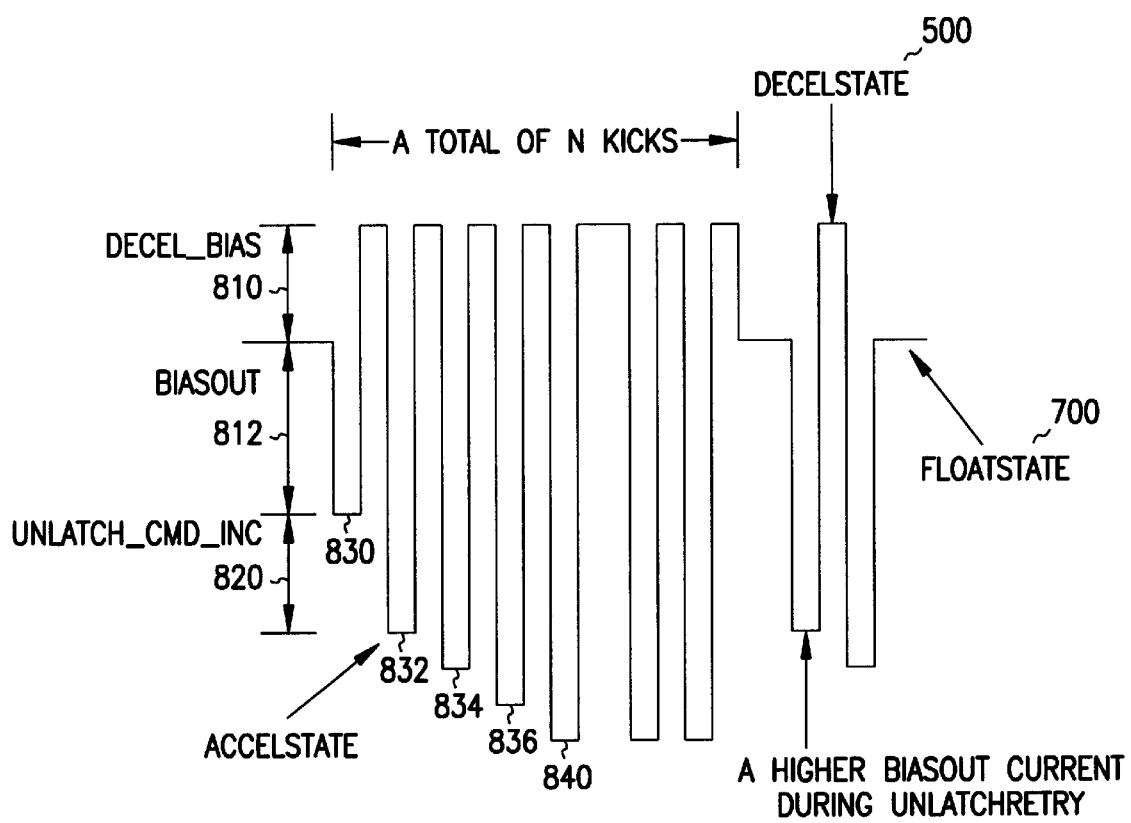
FIG. 8 is a schematic representation of the overall process of the invention.

FIG. 8 is a schematic representation of the sequence of the overall AC unlatch routine. FIG. 8 is a diagram of the alternating current unlatch routine which includes a retry. Initially, there is a BIASOUT 812 followed by a decoloration bias, DECEL 810. Also, there is an UNLATCH_CMD_INC 820. The actuator arm is kicked using an alternating current and during the acceleration state 600, each of a total n kicks are attempted. The UNLATCH_CMD_INC is used to add on to the amount of BIASOUT during the acceleration state. For example, the first kick 830 differs from the second kick 832 by the amount of the UNLATCH_CMD_INC 820. The increment is added on to each of the subsequent kicks 834 and 836 to produce even higher bias out values. The UNLATCH-CMD-INC is added to a selected number of the kicks or current outputs to the actuator voice coil motor. If it is determined that the number of kicks were unsuccessful, a higher initial BIASOUT current is used during an unlatch retry. After the initial BIASOUT current is set, an UNLATCH_CMD_INC 820 is added on subsequent kicks until the actuator becomes unlatched. At that point, the actuator undergoes a FloatState 700 until the actuator comes under control and enters onto or over data band zone 210.

Therefore, the invention reduces the amount of current necessary to unlatch the actuator. This decreases the size and cost of the power amplifier required to produce an unlatch current. The invention is thus advantageously suited for disc drives intended to have increased non-operational rotational shock requirements.

Figure 10:
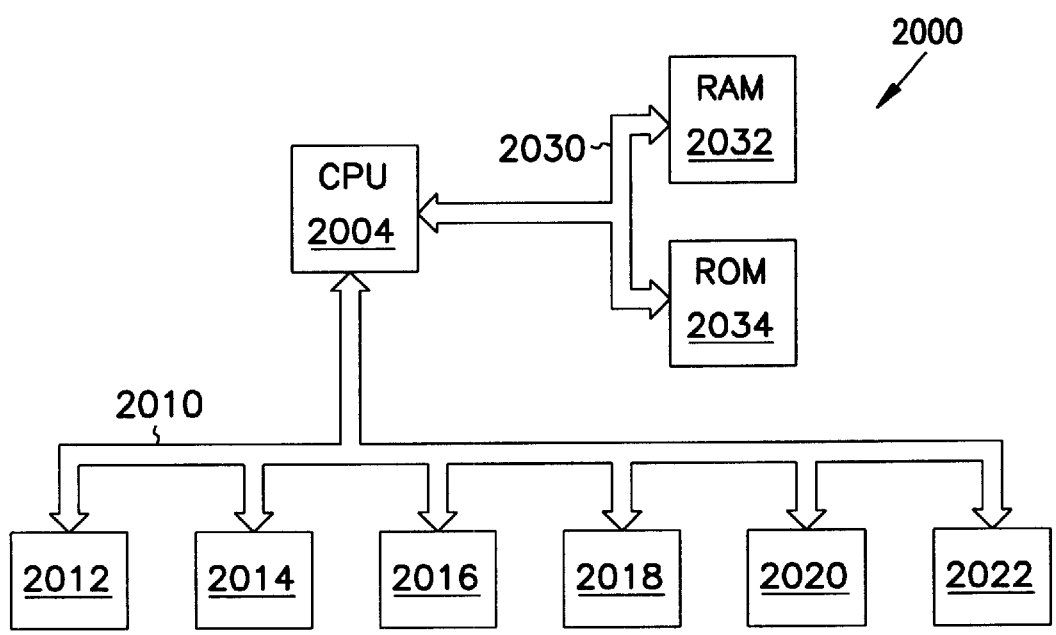
FIG. 10 is a schematic view of a computer system.

FIG. 10 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device that includes the ramp described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for unlatching the actuator as described above In conclusion, a method of unlatching an actuator of a disc drive 100 comprising a base 112, an actuator 120 attached to the base, a voice coil motor 128, 130 that determines the motion and position of the actuator 120, and a disc 134 rotatably attached to the base 112, is disclosed. The disc 134 is provided with a plurality of servo zones 200, 201, 210 corresponding to a respective plurality of profiles of the actuator motion with respect to the disc 134. A current driver 244 applies variable frequency and/or magnitude current to the voice coil motor 128, 130 based on the servo zone 200, 201, 210 of the disc 134 in which the actuator 120 is located. The disc 134 may be provided with at least a parking band zone 200 defining a first area in which the actuator 120 remains parked, and a guard band zone 210 defining a second area in which the actuator 120 has just become unlatched. The parking band zone 200 may be provided with a servo band 210 that determines whether the actuator 120 has unlatched successfully. The current driver 244 may apply alternating current when the actuator 120 is in the parking band zone 200. The current driver 244 may monitor the position of the actuator 120 when the actuator is in the guard band zone 210, and adjust the speed of the actuator 120 based on the motion of the actuator 120. The current driver 244 may apply at least two, and preferably four, different frequencies of alternating current. The current driver 244 may attempt to unlatch the actuator 120 at least two, and preferably thirty-two, times. The current driver 244 may change the frequency if at least one, and preferably eight, attempt(s) has (have) been unsuccessful. The current driver 244 may apply a variable initial current magnitude during each subsequent attempt to unlatch the actuator 120 after an unsuccessful attempt.

Also disclosed is a disc drive 100 adapted to accomplish any or all of the method(s) disclosed.

Also disclosed is an information handling system 1000 including a base 112, an actuator 120 attached to the base 112, a disc 134 rotatably attached to the base 112, a voice coil motor 128, 130 coupled to the actuator 120, and means for applying variable frequency and/or magnitude current to the voice coil motor 128, 130. The disc 134 has a plurality of servo zones 200, 201, 210 corresponding to a respective plurality of profiles of the motion of actuator 120 with respect to the disc 134. The motion and position of the actuator 120 are determined by a voice coil motor 128, 130 based on the servo zone 200, 201, 210 of the disc 134 in which the actuator 120 is located.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. In a data storage device comprising a storage medium having first and second zones, an actuator for accessing the data storage medium and a motor for position the actuator, a method of unlatching the actuator from a stationary position in the first zone, comprising steps of:

a) applying a first current to the motor until the actuator has left the first zone and entered the second zone, the first current having a first profile associated with the first zone; and b) applying a second current to the motor until the actuator has left the second zone, the second current causing the actuator to travel in a single direction.

2. The method of claim 1, in which the first zone comprises a parking band zone in which the actuator is positioned until the actuator is unlatched, and the second zone comprises a guard band zone through which the actuator travels after being unlatched.

3. The method of claim 2, in which the parking band zone comprises a servo band used to determine whether the actuator is unlatched.

4. The method of claim 2, in which the applying step (a) comprises applying alternating current when the actuator is in the parking band zone.

5. The method of claim 2, in which the applying step (b) comprises:

a) monitoring the position of the actuator when the actuator is in the guard band zone, and b) adjusting the speed of the actuator based on the motion of the actuator.

6. The method of claim 4, in which the applying step (a) comprises applying at least two different frequencies of alternating current to the motor.

7. The method of claim 4, in which the applying step (a) comprises attempting to unlatch the actuator at least two times.

8. The method of claim 4, in which the applying step (a) comprises:

(a)(i) applying at least two different frequencies of alternating current to unlatch the actuator;

(a)(ii) and changing the frequency if at least one attempt to unlatch the actuator has been unsuccessful.

9. The method of claim 1, in which the applying step (a) comprises (a)(i) applying a variable initial current magnitude during each attempt to, unlatch the actuator after an unsuccessful attempt.

10. A data storage device comprising:

a) a storage medium comprising first, second and third zones, the third zone comprising data configured to be read and returned to a host device;

b) an actuator for accessing the storage medium, the actuator having a latched position in the first zone c) a motor for positioning the actuator; and d) a current driver which applies a first current to the motor when the actuator is in the first zone, the first current having a profile associated with the first zone, the current driver further applying a second current to the actuator when the actuator is in the second zone, the second current adapted to cause the actuator to travel through the second into the third zone.

11. The data storage device of claim 10, in which the first zone comprises a parking band zone defining a first area in which the actuator is parked until it unlatches and the second zone comprises a guard band zone through which the actuator travels in a single direction after being unlatched.

12. The data storage device of claim 11, in which the parking band zone further comprises a parking boundary zone defining an area in which the actuator has unlatched successfully.

13. The data storage device of claim 11, in which the current driver is adapted to apply alternating current when the actuator is in the parking band zone.

14. The data storage device of claim 11, in which the current driver is adapted to monitor the position of the actuator when the actuator is in the guard band zone, and is further adapted to adjust the speed of the actuator based on the motion of the actuator.

15. The data storage device of claim 12, in which the current driver is adapted to apply at least two different frequencies of alternating current.

16. The data storage device of claim 12, in which the current driver is adapted to attempt to unlatch the actuator at least two times when the actuator is in the parking band zone.

17. The data storage device of claim 12, in which the current driver is adapted to apply at least two different frequencies of alternating current when the actuator is in the parking band zone, and further adapted to attempt to unlatch the actuator at least two times, and still further adapted to change the frequency if at least one attempt has been unsuccessful.

18. The data storage device of claim 17, in which the current driver is adapted to apply four different frequencies of alternating current, further adapted to attempt to unlatch the actuator thirty-two times, and still further adapted to change the frequency if eight attempts have been unsuccessful.

19. The data storage device of claim 12, in which the current driver is adapted to apply a variable initial current magnitude during subsequent attempts to unlatch the actuator after an unsuccessful attempt.

20. The data storage device of claim 10, in which the storage medium comprises a rotatable disc.

* * * * *